United States Patent
Ahn et al.

(10) Patent No.: US 9,773,617 B2
(45) Date of Patent: Sep. 26, 2017

(54) FOLDING TYPE CAPACITOR COMPRISING THROUGH HOLE

(71) Applicant: POINT ENGINEERING CO., LTD., Asan-si, Chungcheongnam-do (KR)

(72) Inventors: Bum Mo Ahn, Suwon-si (KR); Seung Ho Park, Hwaseong-si (KR)

(73) Assignee: POINT ENGINEERING CO., LTD., Asan-si (KR)

(*) Notice: Subject to any disclaimer, the term of this patent is extended or adjusted under 35 U.S.C. 154(b) by 7 days.

(21) Appl. No.: 14/825,538

(22) Filed: Aug. 13, 2015

(65) Prior Publication Data
US 2016/0049251 A1 Feb. 18, 2016

(30) Foreign Application Priority Data

Aug. 18, 2014 (KR) .................. 10-2014-0106748

(51) Int. Cl.
| | |
|---|---|
| *H01G 4/26* | (2006.01) |
| *H01G 4/005* | (2006.01) |
| *H01G 4/30* | (2006.01) |
| *H01G 4/38* | (2006.01) |
| *H01G 4/10* | (2006.01) |

(52) U.S. Cl.
CPC ............ *H01G 4/26* (2013.01); *H01G 4/005* (2013.01); *H01G 4/10* (2013.01); *H01G 4/30* (2013.01); *H01G 4/38* (2013.01)

(58) Field of Classification Search
CPC ...................................................... H01G 4/26
See application file for complete search history.

(56) References Cited

U.S. PATENT DOCUMENTS

| | | | | | |
|---|---|---|---|---|---|
| 2,223,173 | A | * | 11/1940 | Haase | ............... H01G 4/26 |
| | | | | | 361/272 |
| 3,150,301 | A | * | 9/1964 | Schils | ............. H01G 4/228 |
| | | | | | 29/25.42 |

(Continued)

FOREIGN PATENT DOCUMENTS

| | | | | | |
|---|---|---|---|---|---|
| GB | | 578400 A | * | 6/1946 | ............... H01G 4/26 |
| JP | | 61-129326 U | | 8/1986 | |

(Continued)

OTHER PUBLICATIONS

Communication dated Dec. 4, 2015 from the Korean Intellectual Property Office in counterpart Application No. 10-2014-0106748.

*Primary Examiner* — Eric Thomas
(74) *Attorney, Agent, or Firm* — Sughrue Mion, PLLC (57) ABSTRACT

A folding type capacitor includes a metal substrate wherein a through hole penetrates an inside thereof; at least one dielectric layer formed on a surface of the metal substrate and an inner peripheral surface of the through hole; and an electrode layer formed on the at least one dielectric layer, wherein the metal substrate has bending portions whose surfaces are facing each other. Thus, manufacturing process is more simplified since $Al_2O_3$ insulation layers are formed by anodizing the aluminum layer without forming the extra dielectric layers after forming the aluminum layer, so that the manufacturing cost can be reduced, and also a multi-stacked capacitor having a high capacitance and a high reliability can be provided by stacking capacitors including a plurality of aluminum oxide layers using a more simplified process.

11 Claims, 5 Drawing Sheets

(56) References Cited

U.S. PATENT DOCUMENTS

| | | | | |
|---|---|---|---|---|
| 4,127,890 A * | 11/1978 | Rayburn | ............... | H01G 4/26 |
| | | | | 361/301.5 |
| 4,127,891 A * | 11/1978 | Rayburn | ............... | H01G 4/26 |
| | | | | 361/301.5 |
| 4,128,857 A * | 12/1978 | Rayburn | ............... | H01G 4/26 |
| | | | | 361/301.5 |
| 4,146,914 A * | 3/1979 | Rayburn | ............... | H01G 4/26 |
| | | | | 361/304 |
| 4,545,108 A * | 10/1985 | Adams | ............... | H01G 9/0029 |
| | | | | 228/115 |
| 6,621,686 B1 * | 9/2003 | Jenn-Feng | ............... | A61N 1/3956 |
| | | | | 361/503 |

FOREIGN PATENT DOCUMENTS

| | | |
|---|---|---|
| JP | 7-122459 A | 5/1995 |
| JP | 2012-227240 A | 11/2012 |

* cited by examiner

FOLDING TYPE CAPACITOR COMPRISING THROUGH HOLE

TECHNICAL FIELD

The present invention relates to a folding type capacitor, more particularly, relates to a configuration of a capacitor using a dielectric layer.

BACKGROUND ART

Capacitor is used as a battery for storing or discharging electricity, or being utilized for its direct current blocking characteristics, and has a structure wherein a dielectric material is inserted between the two closely placed electrodes which are insulated from each other.

When a direct current is applied to the capacitor, the current starts to flow while the charges are being accumulated in each electrode, but the current stops to flow when the accumulation of the charges are completed. However, if the direct current is applied again after changing the electrodes, the current starts to flow instantaneously. Using such characteristics, the capacitor is used for blocking direct currents but passing the alternate currents, and also it is used for storing electricity.

Such capacitors are classified according to the types of dielectric materials used therein such as air, vacuum, gas, liquid, mica, ceramics, paper, plastic film, electrolyte, and the like.

As for electrolytic capacitors, there are aluminum electrolytic capacitors and tantalum electrolytic capacitors, and electrolytic capacitors generally means aluminum electrolytic capacitors. Electrolytic capacitor uses thin oxide film as a dielectric material and aluminum is used as an electrode material. Since very thin dielectric material can be made, relatively large capacitance can be obtained compared with the volume of the capacitor.

Meanwhile, recently researches on multi-layered ceramic capacitor (MLCC) which is made of alternately stacked ceramic layer and metal (nickel) layer are being actively conducted. A multi-layered ceramic capacitor is made by alternately stacking 200 to 1000 of ceramics layers and metal layers within 0.3 mm height which is a typical thickness of a hair.

A multi-layered ceramic capacitor can store electricity by stacking a plurality of ceramics layers and nickel layers using the principle that nickel conducts electricity since it is a metal, but ceramics cannot conduct electricity.

Multi-layered ceramic capacitors are essential components for the electronic products such as mobile phones, smart phones, LCD TVs, computers, and the like, each requiring several hundreds of MLCCs therein. Miniaturization trends in electronic apparatuses demand MLCCs of smaller in size but having larger capacitance, which require high level technologies.

However, the thickness of such MLCCs become thicker when stacking a plurality of layers, and, moreover, since expensive process equipments are used in continuous stacking of multiple metal layers and insulation layers, thereby increasing manufacturing cost.

SUMMARY OF INVENTION

Technical Problem

An objective of the present invention, to solve the above described technical problems, is to provide a high capacitance capacitor structure which can reduce manufacturing cost by simplifying the manufacturing process thereof.

Yet, another objective of the present invention is to provide a capacitor structure having a high capacitance and a high reliability, and stacking multiple layers can be performed by using a more simple process.

Solution to Problem

To solve the above described technical problems, a folding type capacitor according to an aspect of the present invention includes:

a metal substrate wherein a through hole penetrates an inside thereof;

at least one dielectric layer formed on a surface of the metal substrate and an inner peripheral surface of the through hole; and an electrode layer formed on the at least one dielectric layer, wherein the metal substrate has bending portions whose surfaces are facing each other.

The at least one dielectric layer may be formed on both sides of the metal substrate.

The at least one dielectric layer may be formed on both sides of the metal substrate excluding at least a portion of the bending portions.

The folding type capacitor may further include a first lead wire connected to the metal substrate; and a second lead wire connected to the electrode layer.

The through hole may be included in a plurality of through holes penetrating the inside of the metal substrate.

Further, a folding type capacitor according to another aspect of the present invention includes a plurality of unit capacitors stacked in vertical direction, each of the unit capacitors including:

a metal substrate formed with a through hole penetrating an inside thereof;

a dielectric layer formed on a surface of the metal substrate and an inner peripheral surface of the through hole; and an electrode layer formed on the dielectric layer.

The metal substrate of one of the unit capacitors may be electrically connected to the electrode layer of another of the unit capacitors.

Advantageous Effects of Invention

According to the present invention, manufacturing process is more simplified since $Al_2O_3$ insulation layer is formed by anodizing the aluminum layer without forming an extra dielectric layer after forming the aluminum layer, so that the manufacturing cost can be reduced, and also a multi-stacked capacitor having a high capacitance and a high reliability can be provided by stacking capacitors comprising a plurality of aluminum oxide layers using a more simplified process according to the present invention.

DETAILED DESCRIPTION OF EMBODIMENT

Descriptions hereinafter merely illustrate the basic principles of the invention as examples. Therefore, a person skilled art may implement the principles of the invention and invent various devices included in the concept and the scope of the invention even though it is not clearly explained or illustrated in the description of the present invention. In addition, it should be understood that basically, all the conditional terms and the exemplary embodiments listed in the description of the present invention are clearly intended for the purpose of understanding the concept of the invention, but not limited to the embodiments and the forms especially listed in such a way.

The above described objectives, features, and advantages will become more apparent through the detailed description with reference to the accompanying drawings, accordingly, a person skilled in the art may easily implement the technical spirit of the present invention.

A detailed description of a publicly known prior art related to the present invention will be omitted if determined that it may unnecessarily obscure the gist of the present invention. Hereinafter, a preferred exemplary embodiment according to the present invention will be described with reference to the accompanying drawings.

Figure 1:
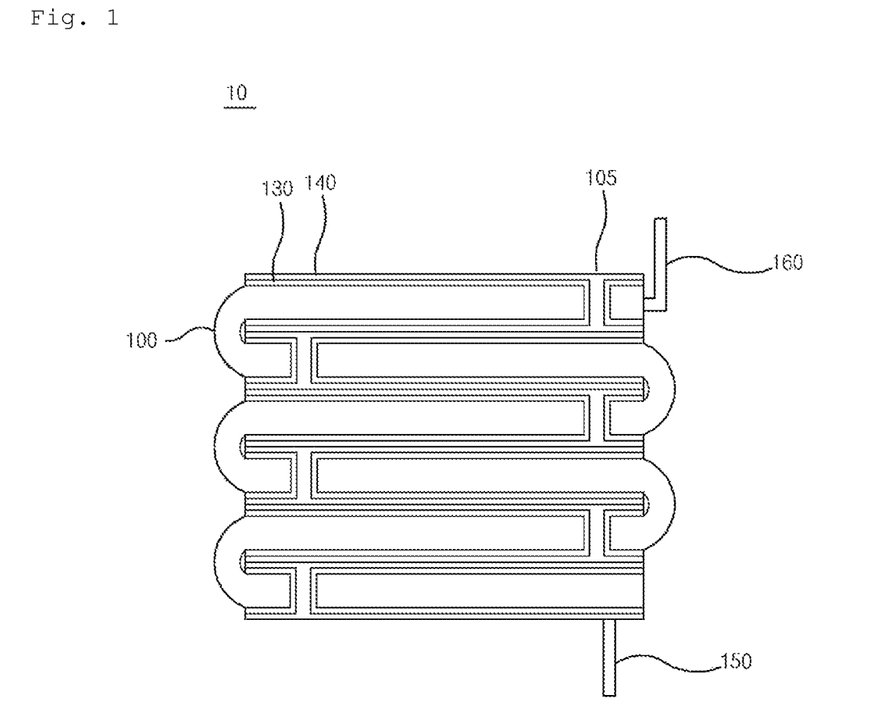
FIGS. 1 and 2 illustrate a folding type capacitor according to an exemplary embodiment of the present invention.

FIG. 1 illustrates a folding type capacitor 10 according to an exemplary embodiment of the present invention (hereinafter, referred to as 'folding type capacitor 10').

Referring to FIG. 1, a folding type capacitor 10 according to an exemplary embodiment of the present invention includes a metal substrate 100, a plurality of dielectric layers 130, a plurality of electrode layers 140, and the lead wires 150 and 160.

The metal substrate 100 according to an exemplary embodiment of the present invention may be made of various metals or metal alloys flexible and capable of bending, and, for convenience, it will be described with an example of aluminum substrate 100 hereinafter.

Furthermore, the aluminum substrate 100 in the exemplary embodiment of the present invention may also be made of various alloys containing aluminum other than a pure aluminum.

The aluminum substrate 100 in the exemplary embodiment of the present invention is for forming an aluminum oxide layer 130 through anodizing process, and forming an aluminum oxide layer 130 using a dielectric layer will be described as an example hereinafter.

In addition, the aluminum substrate 100 in the exemplary embodiment of the present invention may also perform an electrode function of the capacitor 10 at the same time. A high capacitance capacitor 10 may be constructed by combining multiple capacitors 10 using the flexibility of an aluminum in a stacked structure which will be described later.

The aluminum substrate 100 in the exemplary embodiment of the present invention is being folded together through the bending portion in order to form at least one facing surface.

Further, a plurality of through holes 105 may be formed in the aluminum substrate 100 in the exemplary embodiment of the present invention A plurality of aluminum oxide layers 130 and a plurality of electrode layers 140 are formed inside the through holes 105, and this will be described later.

The aluminum oxide layers 130 in the exemplary embodiment of the present invention are formed on the surface (of the aluminum substrate) and the inner peripheral surfaces of the through holes 105, and performs the function of the dielectric layers between the electrode layers 140, which will be described later, and the aluminum substrate 100. That is, since the aluminum oxide layers 130 are the electrically non-conducting insulators, they are dielectric layers or functioning as dielectric layers in a capacitor 10 according to a preferred in exemplary embodiment of the present invention.

Therefore, the manufacturing process of a capacitor 10 according to a preferred in exemplary embodiment of the present invention can be simplified since dielectric layers are formed by anodizing the aluminum layer of the aluminum substrate 100 without forming extra insulation layers.

The electrode layers 140 in an exemplary embodiment of the present invention are formed on the aluminum oxide layers 130, thus, the electrode layers 140 are separately and plurally formed on each of the aluminum oxide layers 130 which are separately formed, and bonded to each other on the facing surfaces of the aluminum substrate 100.

At this time, the aluminum substrate 100 is bended and folded at a region wherein no aluminum oxide layers 130 and no electrode layers 140 are formed, therefore, each pair of the electrode layers 140 facing each other on the surface of the aluminum substrate 100 are bonded together, and forms one electrode unit thereby.

Figure 2:
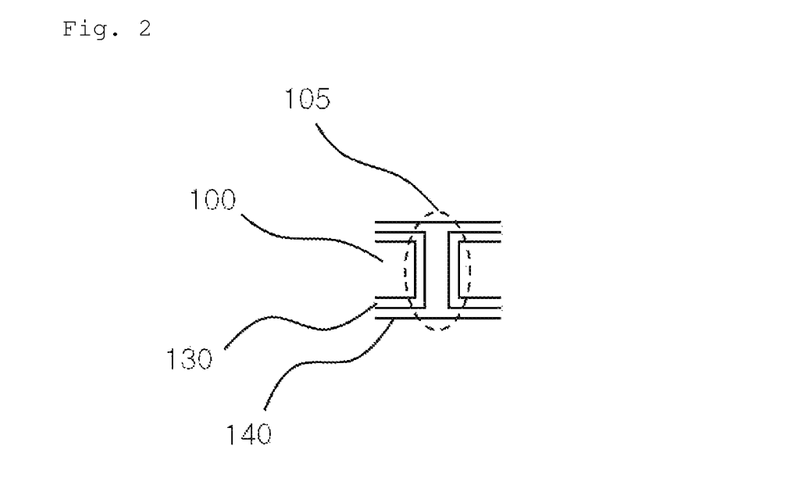

At this time, referring to FIG. 2, the aluminum oxide layers 130 are formed on the inner peripheral surface of the through hole 105 formed inside the aluminum substrate 100 as described above, and the electrode layers formed on both sides of the aluminum substrate 100 are electrically connected to each other through the electrode layers 140 formed on the aluminum oxide layers 130 of the inner peripheral surface of the through hole 105.

In addition, forming of a plurality of through holes 105 is possible according to a preferred exemplary embodiment of the present invention. When they (through holes) are plurally formed, the surface area of the electrode layer is more enlarged including the inner peripheral surface of the through hole, thus manufacturing of a high capacitance capacitor becomes possible.

Therefore, the surface area of the electrode unit is greatly increased with respect to the volume of the capacitor 10 by connecting each of the electrode layers 140, which are bended and folded, into one electrode unit, thus the total capacitance of the capacitor 10 is increased thereby.

In addition, the folding type capacitor 10 in an exemplary embodiment of the present invention further includes the lead wires 150 and 160. The first lead wire 160 is connected to the aluminum substrate 100 and the electrode layer 140, and a voltage is applied to the aluminum substrate thereby. The second lead wire 150 applies a voltage, having a different polarity than that of the voltage applied to the aluminum substrate 100, to the electrode layer 140.

At this time, in an exemplary embodiment of the present invention, the aluminum substrate 100 and the electrode layers 140 are electrically connected via the aluminum oxide layers 130 formed on the aluminum substrate 100, and thus, a folding type capacitor 10 according to an exemplary embodiment of the present invention can be implemented through the aluminum substrate 100 and the electrode layers 140, wherein voltages of different polarities are applied thereto respectively.

Further, the folding type capacitor 10 comprising a plurality of aluminum oxide layers 130 in an exemplary embodiment of the present invention may further includes a plurality of grooves 110 and a plurality of masking portions 120.

The grooves 110 may be formed beforehand at the bending positions in order to prevent from breaking of the aluminum substrate 100 due to the pressure focussing on the bending portions when the aluminum substrate 100 is being bent.

At this time, the grooves 110 may be formed as the line-type grooves along the bending lines, and furthermore, the depth or the width of the grooves 110 may vary according to the thickness of the aluminum substrate 100 and the bending angle thereof.

In addition, the masking portions 120 may be formed inside the grooves 110 in order to form the aluminum oxide layers 130 on both sides or one side of the aluminum substrate 100 excluding at least a portion of the bending portions.

Figure 11:
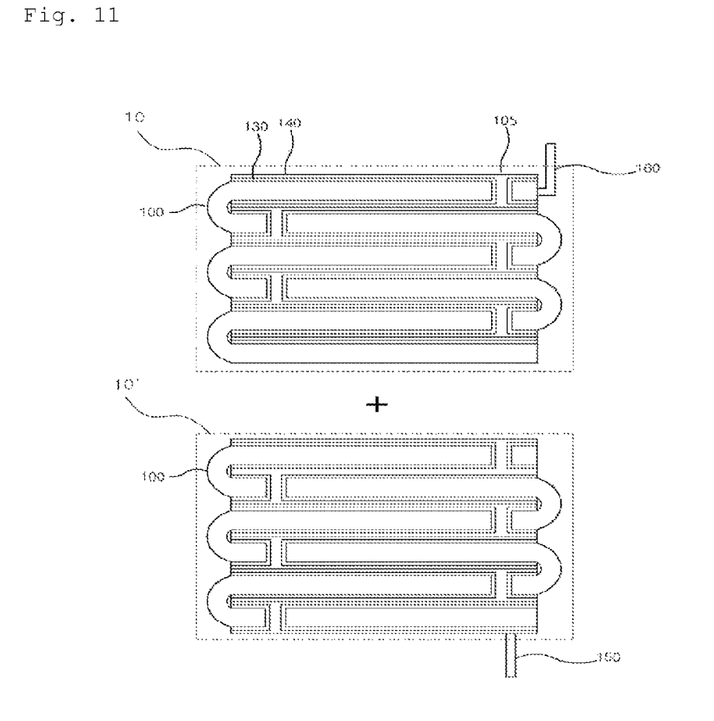
FIG. 11 illustrates the serially connected folding type capacitors comprising through holes according to an exemplary embodiment of the present invention.

In addition, referring to FIG. 11, a serial connection of folding type capacitors is also possible by forming a connecting portion for electrically connecting the aluminum substrate 100 of the folding type capacitor 10 to the electrode layers 140 of the other folding type capacitor 10 using the folding type capacitors according to an exemplary embodiment of the present invention.

In other words, the folding type capacitors of the above may be used as unit capacitors. In this case, a folding type capacitor configured by the unit capacitors includes the unit capacitors stacked in the vertical direction, and the metal substrate of one of the unit capacitors is electrically connected to the electrode layer of another of the unit capacitors.

Hereinafter, a method for manufacturing a folding type capacitor 10 according to an exemplary embodiment of the present invention will be described in detail with reference to FIG. 3.

Figure 3:
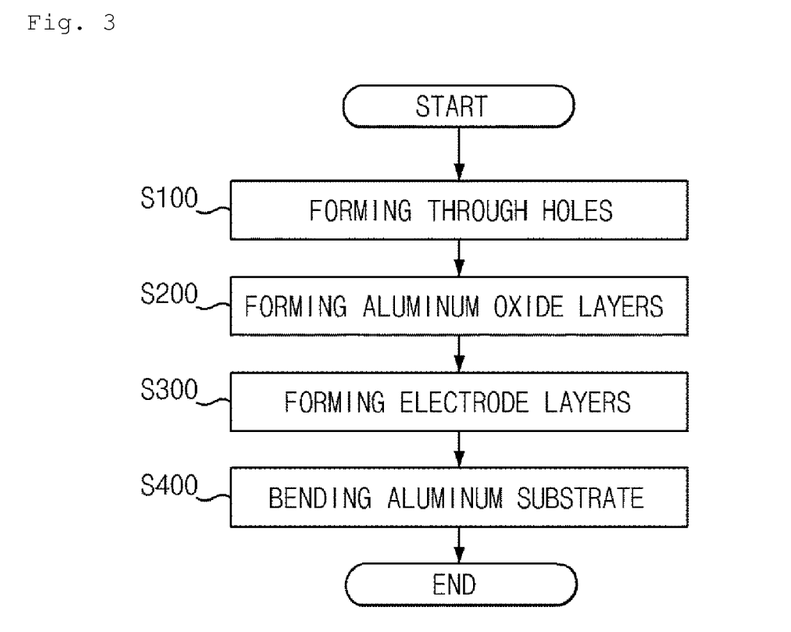
FIG. 3 illustrates a method for manufacturing a folding type capacitor according to an exemplary embodiment of the present invention.

Referring to FIG. 3, a method for manufacturing a folding type capacitor 10 comprising an aluminum oxide layer 130 comprises the steps of: forming the through holes (S100); forming the aluminum oxide layers (S200); forming electrode layers (S300); and bending the aluminum substrate (S400). In addition, steps of forming the grooves and forming the masking portions may further be included prior to the step of forming the aluminum oxide layers (S200).

First, in an exemplary embodiment of the present invention, a plurality of through holes 105 are formed in step S100 for forming the through holes. As seen in FIG. 1, a folding type capacitor 10 according to an exemplary embodiment of the present invention is bended and folded using the flexibility of an aluminum, and since the penetrating through holes 105 must be formed while being folded, a plurality of through holes 105 penetrating the aluminum substrate 100 are formed in step S100 for forming the through holes.

Figure 4:
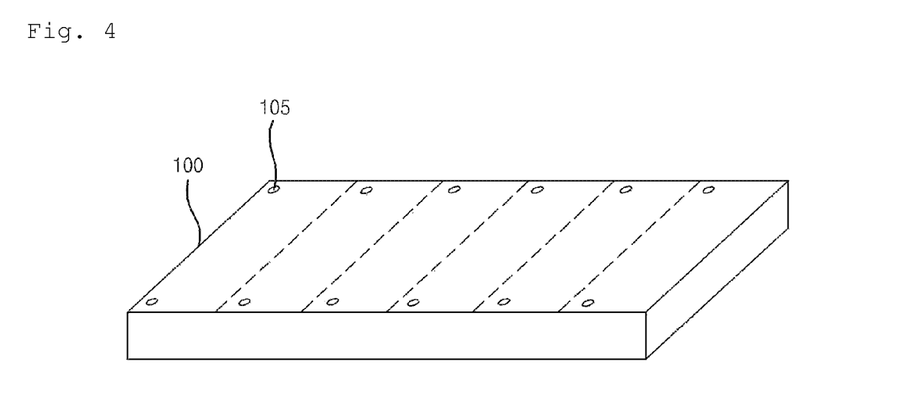
FIGS. 4 to 10 illustrate manufacturing process of a folding type capacitor according to an exemplary embodiment of the present invention.

At this time, since the aluminum substrate 100 is bended in zigzag direction, it is preferred that the through holes 105 having same separation distance are formed as referred to FIG. 4.

Figure 5:
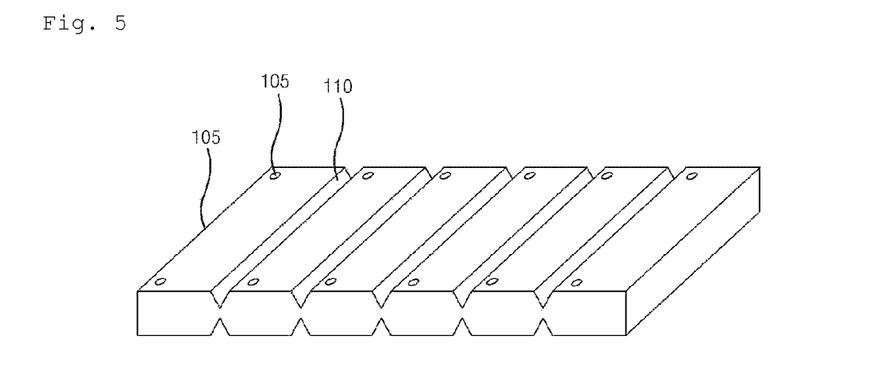

Next, in a step for forming grooves in the aluminum substrate 100, wherein the through holes 105 are formed, a plurality of grooves having a predetermined depth are formed in at least a portion of the bending portion at the bending locations. The grooves 110 may be formed through machining, press forming, or V-cut and so on, and although it is illustrated in FIG. 5 that they (the grooves) are formed in the locations corresponding with respect to both sides or one side (of the substrate), they (the grooves) may also be formed on one side (of the substrate), and forming at the different locations on each of the surfaces to have a different width or a different thickness is also possible.

The grooves 110 may be formed beforehand at the bending positions in order to prevent from breaking of the aluminum substrate 100 due to the pressure focussing on the bending portions when the aluminum substrate 100 is being bent.

Figure 6:
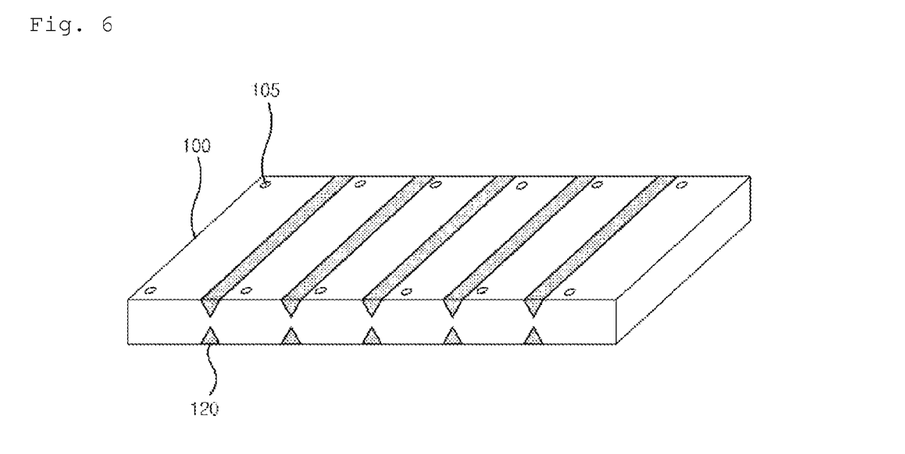

Next, the step for forming masking portions will be described with reference to FIG. 6.

In the step for forming masking portions, the masking portions 120 are formed inside the grooves 110 in order to form the aluminum oxide layers 130 on both sides or on one side of the aluminum substrate 100 excluding at least a portion of the bending portions. Referring to FIG. 6, the step for forming masking portions are for filling the space formed in the step for forming grooves 110 with the masking ink and the like, and for preventing the defects in the dielectric coating of the grooves 110 during bending, and further, the masking portions are formed for insulation between the electrode layers 140, which are formed later, and the aluminum substrate 100.

At this time, masking can be made of a polymer material such as silicon, urethane, etc. using screen printing, dispensing, ink-jet printing, and the like.

In the above described exemplary embodiment, the steps of forming grooves and forming masking portions are performed after the step for forming through holes, however, this order is just for convenience of description only, and, of course, it is changeable in the course of processing.

Figure 7:
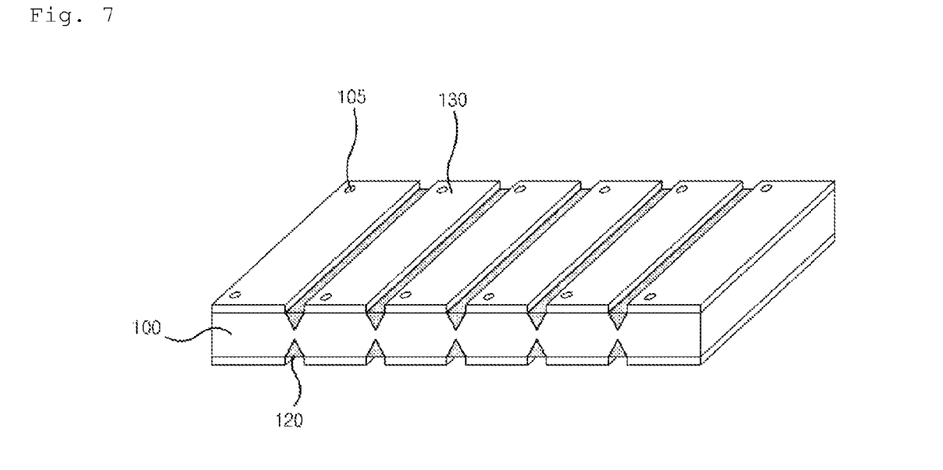

Next, in step S200 for forming the aluminum oxide layers, the aluminum oxide layers 130 are formed on both sides or one side of the aluminum substrate 100 excluding at least a portion of the bending portion considering the bending portions which are bended in order to form at least a pair of facing surfaces on the aluminum substrate 100.

Referring to FIG. 7, in step S200 for forming the aluminum oxide layers according to an exemplary embodiment of the present invention, an aluminum oxide layers are formed on the exposed area except the masking portions 120 on both sides or one side of the aluminum substrate 100. In other words, anodizing is performed on the surfaces of the exposed aluminum substrate in order to form the aluminum oxide layers 130 as a dielectric layer. At this time, process can be performed using methods such as etching, sulfuric acid method, oxalic acid method, and the like. And, the aluminum oxide layers 130 may be formed as a barrier type or a pore type.

In addition, an aluminum oxide layers 130 may be formed on the surface of the through holes 105 in the aluminum substrate 100 according to an exemplary embodiment of the present invention.

Figure 8:
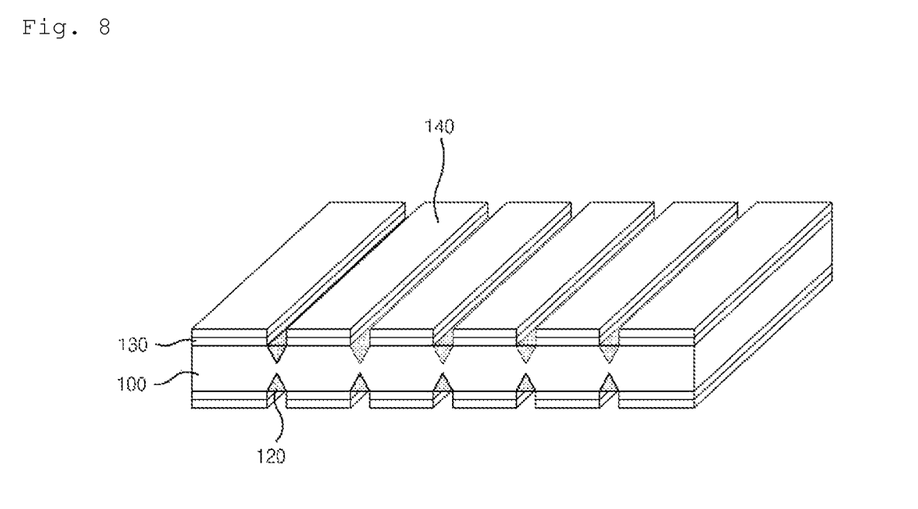

Next, in step S300 for forming the electrode layers according to an exemplary embodiment of the present invention, a plurality of electrode layers 140 are formed on the aluminum oxide layers 130 on both sides or one side of the aluminum substrate 100 respectively.

Referring to FIG. 8, the electrode layers 140 according to an exemplary embodiment of the present invention are formed on the aluminum oxide layers 130 formed on the aluminum substrate 100. Thus, the aluminum substrate 100 and the electrode layers 140 are insulated to each other by the aluminum oxide layers 130. At this time, the electrode layers 140 may be formed by processing metals such as Ni, NiCr, NiCr/Cu, Al, etc. using a technique such as physical vapor deposition (PVD) or chemical vapor deposition (CVD) or electroless plating or electrolytic plating, etc.

In other words, the aluminum oxide layers 130 are formed on the surfaces of the through holes 105 formed inside the aluminum substrate 100, and the electrode layers formed on both sides of the aluminum substrate 100 are electrically connected to each other through the electrode layers formed on the aluminum oxide layers 130 on the surfaces of the through holes.

Figure 9:
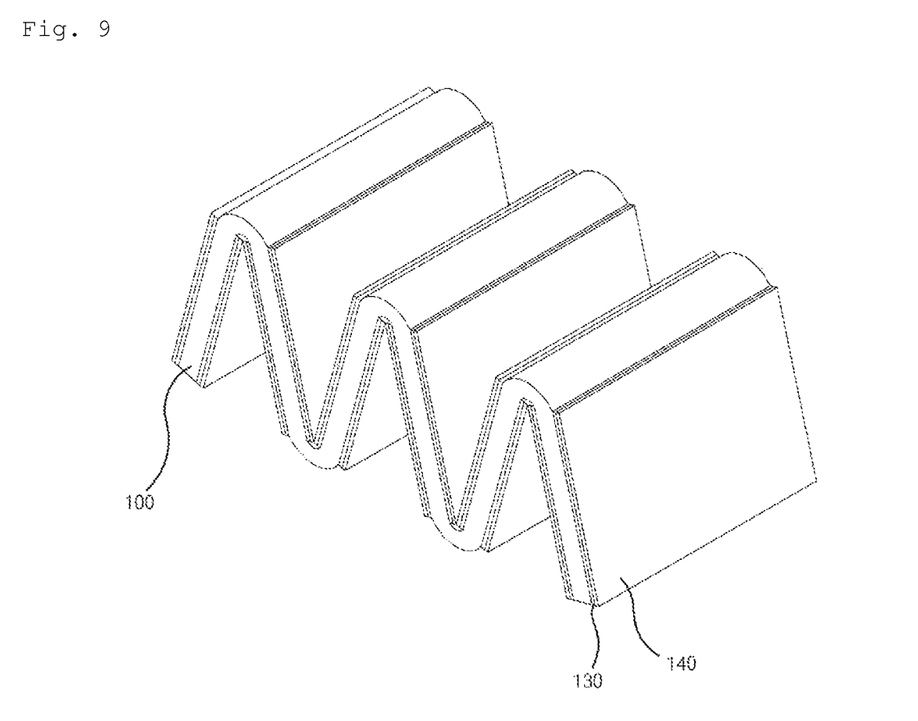

In step S400 for bending the aluminum substrate according to an exemplary embodiment of the present invention, the aluminum substrate 100 is bended and folded so that the electrode layers 140 formed on both sides or one side of the aluminum substrate can be bonded at the facing surfaces on the aluminum substrate 100.

That is, referring to FIG. 9, the aluminum substrate 100 is zigzag folded by bending using a bending machine or by pressing using a press so that the electrode layers (148) are bonded to each other in order to eventually increase the surface area of the electrode.

In other words, the step S400 for bending the aluminum substrate may be performed until the electrode layers 140 formed on the aluminum substrate 100 are being bonded to each other, and thus, each of the electrode layers formed on both sides of the aluminum substrate 100 are electrically connected to each other via the electrode layers formed on the aluminum oxide layers 130 on the surfaces of the through holes.

Figure 10:
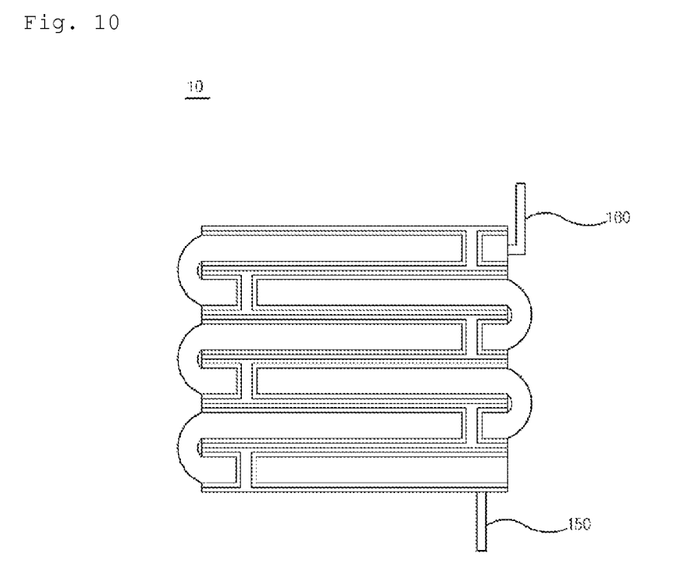

Next, a method for manufacturing a folding type capacitor according to an exemplary embodiment of the present invention may further include a step for forming the lead wires. Referring to FIG. 10, the lead wires 150 and 160, through which voltages can be applied to the aluminum substrate 100, are formed in the step for forming the lead wires.

Further, a method for manufacturing a folding type capacitor 10 according to an exemplary embodiment of the present invention may further include a sealing step for sealing the folding type capacitor 10 manufactured through the above described steps with a sealant.

According to the above described present invention, a highly reliable high capacitance folding type capacitor can be provided by stacking capacitors comprising aluminum oxide layers using a more simplified process.

Although the foregoing description exemplarily describes the technical spirits of the present invention, those skilled in the art will appreciate that various modifications, additions and substitutions are possible, without departing from the fundamental characteristics of the present invention.

Therefore, the embodiments and accompanying drawings disclosed in the present invention are intended to illustrate but not to limit the scope of the technical spirits of the present invention, and the scope of the present invention is not limited by the embodiments and the accompanying drawings. The scope of the present invention shall be construed on the basis of the accompanying claims in such a manner that all of the technical spirits included within the scope equivalent to the claims belong to the present invention.

What is claimed is:

1. A folding type capacitor comprising:
   a metal substrate having a first surface and a second surface which is opposite to the first surface, wherein a through hole penetrates an inside thereof;
   at least one dielectric layer formed on the first surface of the metal substrate and an inner surface of the through hole in a manner that an entire portion of the inner surface of the through hole is covered by the at least one dielectric layer to prevent the metal substrate from being exposed in the through hole; and
   an electrode layer formed on the at least one dielectric layer,
   wherein the metal substrate has bended portions so that a portion of the first surface of the metal substrate faces another portion of the first surface of the metal substrate, and
   wherein the electrode layer passes through the through hole.

2. The capacitor according to claim 1, wherein the at least one dielectric layer is formed on both of the first and the second surfaces of the metal substrate.

3. The capacitor according to claim 1, wherein the at least one dielectric layer is formed on both of the first and the second surfaces of the metal substrate excluding at least a portion of the bended portions.

4. The capacitor according to claim 1, further comprising:
   a first lead wire connected to the metal substrate; and
   a second lead wire connected to the electrode layer.

5. The capacitor according to claim 1, wherein the metal substrate comprises a plurality of the through holes penetrating the inside of the metal substrate.

6. The capacitor according to claim 1, wherein the metal substrate is folded in a manner that at least two portions of the surface of the metal substrate are facing each other.

7. The capacitor according to claim 6, wherein at least one groove is formed on at least one folded portion of the metal substrate whereat the metal substrate is folded so that the metal substrate is prevented from being broken by being folded.

8. The capacitor according to claim 7, wherein the at least one dielectric layer is formed by anodizing the metal substrate.

9. The capacitor according to claim 8, further comprising:
   at least one masking portion disposed in the at least one groove so as to prevent the at least one folding portion of the metal substrate from being anodized.

10. A folding type capacitor comprising a plurality of unit capacitors stacked in vertical direction, each of the unit capacitors including:
    a metal substrate formed with a through hole penetrating an inside thereof;
    a dielectric layer formed on a surface of the metal substrate and an inner surface of the through hole in a manner that an entire portion of the inner surface of the through hole is covered by the dielectric layer to cover the metal substrate from being exposed in the through hole; and
    an electrode layer formed on the dielectric layer,
    wherein the electrode layer passes through the through hole.

11. The capacitor according to claim 10, wherein the metal substrate of one of the unit capacitors is electrically connected to the electrode layer of another of the unit capacitors.

* * * * *